May 19, 1970 M. I. RACKMAN 3,513,258

ELECTROLUMINESCENT TELEVISION SYSTEM

Filed June 13, 1967

INVENTOR.
MICHAEL I. RACKMAN

BY Amster & Rothstein

ATTORNEYS

United States Patent Office 3,513,258
Patented May 19, 1970

3,513,258

ELECTROLUMINESCENT TELEVISION SYSTEM

Michael I. Rackman, 549 Ocean Parkway, Brooklyn, N.Y. 11218

Filed June 13, 1967, Ser. No. 645,743
Int. Cl. H04n 3/12
U.S. Cl. 178—7.3 4 Claims

ABSTRACT OF THE DISCLOSURE

An electroluminescent television system having horizontal and vertical arrays of parallel conductors with an electroluminescent phosphor film interposed between them. The vertical conductors are connected at spaced intervals to a delay line having a delay sufficient for the delay line to represent an entire line of the picture signal. Successive lines of the video signal are fed into the right end of the delay line. The signals travel down the delay line to the left end. Just at the instant when a complete line of the picture signal is within the delay line between the leftmost and the rightmost vertical conductors, one of the horizontal conductors is momentarily energized. This causes a complete line of the picture signal to be displayed. The horizontal conductors are sequentially energized to form the complete display. Each line of the display is formed as a unit at the end of the reception of a complete line of the video signal. In this manner the vertical conductors need not be sequentially energized during each line cycle as in prior art electroluminescent display systems.

This invention relates to electroluminescent display systems, and more particularly to electroluminescent television systems.

Electroluminescent phosphors, under the influence of an externally applied electric field, luminesce with the intensity of the emitted light being a function of the strength of the applied field. If first and second (for example, horizontal and vertical) arrays of parallel, separated electrical conductors are positioned on each side of a film or layer of an electroluminescent phosphor to form a crossed grid structure, when a suitable electric potential difference is applied between any one horizontal-vertical conductor pair, the phosphor at the crosspoint will luminesce. It has been proposed to use electroluminescent panels of this type as replacements for the cathode ray tubes in television receivers.

One such prior art system is disclosed in Livingston Pat. No. 2,774,813, issued Dec. 18, 1956. In the Livingston system a gate is connected to each vertical conductor. The incoming video signal is applied to the inputs of all vertical gates, but all gates are normally open and the video signal is not applied through the gates to the vertical conductors. A counter is provided to sequentially close the vertical gates. The leftmost gate is first operated, followed by the gate next to it, etc., until the rightmost vertical gate is energized. Thus, the incoming video signal is sequentially applied to the vertical conductors. During each complete sweep of the vertical conductors by the video signal, i.e., during a complete cycle of energization of the vertical gates, one of the horizontal conductors is energized. Thus, during a single sweep a single row or line of video information is displayed by the panel. Thereafter, in the next line cycle, the next horizontal conductor is energized and another line of signal information is displayed beneath the first The Livingston system is an improvement over prior art displays of the same type in that each crosspoint includes a diode to prevent current flow through the phosphor film other than at the particular crosspoint which is to be energized. However, the Livingston system exhibits a shortcoming which is present in other prior art displays of this general type. In the Livingston system, for example, two counters are provided, one for energizing the vertical conductors in sequence and the other for energizing the horizontal conductors in sequence. The counter for energizing the vertical conductors operates at a much faster rate than the counter for energizing the horizontal conductors, since all vertical conductors must be energized for each count of the horizontal conductor counter. In a typical television receiver there are 525 horizontal lines which are swept through during each frame. The horizontal conductor counter, if it is a binary counter, thus requires nine stages. Suppose, for example, that 1024 vertical conductors are used. The vertical conductor counter thus requires 10 stages. These counters, in and of themselves, not to mention all of the gates, add considerably to the overall cost of the equipment and its complexity. Furthermore, the vertical conductor counter and the gates must operate at high speed. Typically, a single sweep in a conventional television receiver requires 63.5 microseconds during which interval visual information is displayed for 53.3 microseconds. If 1024 vertical gates must be energized for each line of video signal, the vertical counter must operate above a 53.3 nanosecond rate. Although it might be advantageous to eliminate the horizontal conductor counter, it appears that the greatest savings can be obtained by eliminating the vertical conductor counter.

It is an object of my invention to provide an electroluminescent television panel which does not require a mechanism for sequentially energizing the various panel vertical conductors.

Briefly, in accordance with the principles of my invention, I provide, in the illustrative embodiments of the invention, a delay line having a 63.5 microsecond delay. Each of the vertical conductors is coupled to the delay line along its length at equal spaced intervals, within the fraction $^{53.3}/_{63.5}$ of the line at its left end, i.e., corresponding to that portion of each line cycle containing information to be displayed. The video signal is applied to the right side of the delay line and travels along the delay line to the left end thereof. Since the video signal travels along the delay line, the signal at each point along it, corresponding to a respective vertical conductor, constantly changes. Although signals constantly change, unlike the Livingston system no horizontal conductor is energized during each 63.5 microsecond cycle. Only at the end of each cycle is one of the horizontal conductors energized. Just at this time one complete line of video signal information appears in the delay line within that portion of it coupled to the vertical conductors, and the entire line of video information causes the respective line of electroluminescent phosphor to luminesce. The horizontal conductor is energized for only an instant, during which time the line of video information is "dumped" into this conductor. Immediately thereafter the horizontal conductor is de-energized. Another line of video information is fed into the delay line and travels down it from the right end toward the left end. At the end of the next 63.5 microsecond cycle the next horizontal conductor is energized and the second line of video information is translated into a visual signal. This process continues with each line of video information being displayed only at the end of each line cycle.

It should be noted that successive lines of video information are fed sequentially into the right end of the delay line. The initial portion of one line signal immediately follows the terminal portion of the preceding line signal (separated by a blank portion corresponding to the blanking interval). Consider the middle conductor in the vertical group. At the end of any line cycle, when one of the horizontal conductors is energized, the potential in the delay line at the point to which the middle vertical conductor is connected corresponds to the signal at the middle of the line of video information, and causes a corresponding visual signal to be produced in the panel. The horizontal conductor is then de-energized. The video signal in the delay line continues to travel to the left and another line of video information is applied at the right end. The previous line information travels down the delay line and the last half of it passes by that point to which the middle conductor is connected. Of course, it has no effect on the display because no horizontal conductor is energized during this time. Approximately at the middle of this 63.5 microsecond cycle, the front portion of the new video line signal is applied to the middle vertical conductor. Of course, it, too, has no effect on the display since no horizontal conductor is energized. Thereafter, the first half of the new video line signal passes the point in the delay line to which the middle vertical conductor is connected. At the end of the new 63.5 microsecond cycle, the middle portion of the new video line signal is at that point in the delay line to which the middle vertical conductor is connected. At this time the next horizontal conductor is energized and this video information is dumped through the middle vertical conductor and the energized horizontal conductor to cause the corresponding phosphor crosspoint to luminesce.

It is also possible to use a delay line to energize the horizontal conductors. The delay of this line is much greater, there being 525 horizontal conductors connected to the line, with a 63.5 microsecond delay between each conductor. Each frame vertical sync pulse (every other vertical field sync pulse in a conventional receiver) may be applied to the upper portion of the delay line, this pulse traveling down the line and energizing successive horizontal conductors at 63.5 microsecond intervals. At the end of each frame, the initial vertical sync pulse will have energized each of the 525 horizontal conductors. Although a delay line may be used for this purpose, it may be more convenient to utilize the Livingston-type counter since only nine relatively low-speed stages are required.

The main advantage of using the delay line approach is that the vertical conductor counter may be eliminated along with the vertical gates. It should be noted that the vertical conductor delay line is not used to control the sequential energization of the vertical conductors. The timing of the crosspoint phosphor energizations is controlled by the horizontal conductors. The vertical conductor delay line insures that a complete line of video information will be coupled to all of the vertical conductors at the end of each line cycle, at which time one of the horizontal conductors is energized.

Further objects, features and advantages of my invention will become apparent upon consideration of the following detailed description in conjunction with the drawing in which.

Figure 1:
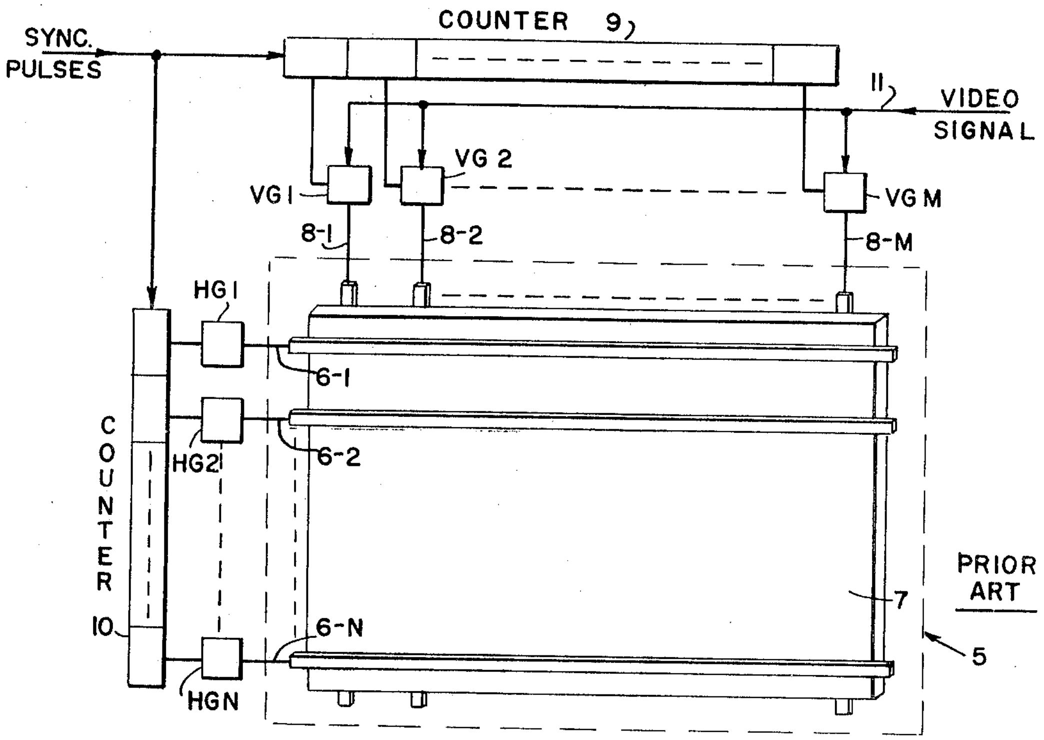
FIG. 1 is a schematic illustration of a prior art type electroluminescent television panel.

The electroluminescent panel 5 of FIG. 1 is shown only symbolically. It includes a plurality of horizontal conductors 6–1 through 6–N (all preferably transparent) on the forward face of electroluminescent film 7. Vertical conductors 8–1 through 8–M are attached to the rear of the electroluminescent film. The phosphor at each crosspoint has an electric field applied across it depending upon the potentials of the vertical and horizontal conductors coupled to it. The light emitted by the phosphor at the crosspoint is dependent upon the magnitude of the electric field. The details of the phosphor film and the horizontal and vertical conducting strips are not essential for an understanding of the present invention. The panel 5 itself may be of prior art types, such as that disclosed in the above-identified Livingston patent. See, also Bowerman et al., Pat. No. 2,999,958, issued Sept. 12, 1961; Piper Pat. No. 2,698,915, issued Jan. 4, 1955; and Larach Pat. No. 2,925,532, issued Feb. 16, 1960.

In the prior art system of FIG. 1, each of the vertical conductors is connected to a respective one of gates VG1 through VGM, and the horizontal conductors are connected to respective ones of gates HG1 through HGN. Sync pulses are applied to the inputs of both counters 9 and 10. The outputs of counter 10 are connected to respective ones of gates HG1 through HGN, and sequentially operate these gates to energize the horizontal conductors. The outputs of counter 9 are connected to respective ones of gates VG1 through VGM and operate these gates in sequence to allow the transmission of electrical signals therethrough. The video signal is applied by conductor 11 to the inputs of all vertical gates, and depending on the particular vertical gate which is operated at any instant by counter 9 the video signal is applied to the respective vertical conductor. Counter 9 operates at a very fast rate so as to operate all of gates VG1 through VGM in sequence during each sweep of the video signal. Counter 10 operates at a much slower rate so as to energize only one of the horizontal gates during each sweep. (Although not shown in the Livingston patent, upon which the circuit of FIG. 1 is based, it would appear that counter 10 could be operated from counter 9 since counter 10 must change state only once for each complete cycle of operation of counter 9.)

Initially, gate HG1 is operated to energize horizontal conductor 6–1. Conductor 11 applied a video signal to the inputs of all vertical gates VG1 through VGM. At the beginning of the sweep, counter 9 operates only gate VG1 and the video signal applied to conductor 8–1 results in a visual display at the crosspoint of conductors 6–1 and 8–1. Thereafter, gate VG2 is operated and the video signal applied to conductor 8–2 causes a visual signal to appear at the crosspoint of conductors 6–1 and 8–2. This process continues until the end of the sweep when gate VGM is energized and the rightmost vertical conductor 8–M has the video signal applied to it. Thereafter, gate HG2 is operated and conductor 6–2 is energized. Counter 9 recycles and gates VG1 through VGM operate in sequence to provide another line of visual display. This process continues until the last line of video information is displayed with the operation of gate VGM. Thereafter, another frame of video information is reproduced.

Not only are two counters and many gates required in the system of FIG. 1, counter 9 and gates VG1 through VGM must operate at high speed. This is a consequence of controlling the video signal to be applied to only one vertical conductor at any instant. During each sweep the video signal is continuously applied to the panel, but to only one of the vertical conductors at any time. On the other hand, in the embodiments of my invention shown in FIGS. 2 and 3, during each line cycle the video signal is continuously applied to all of the vertical conductors.

Figure 2:
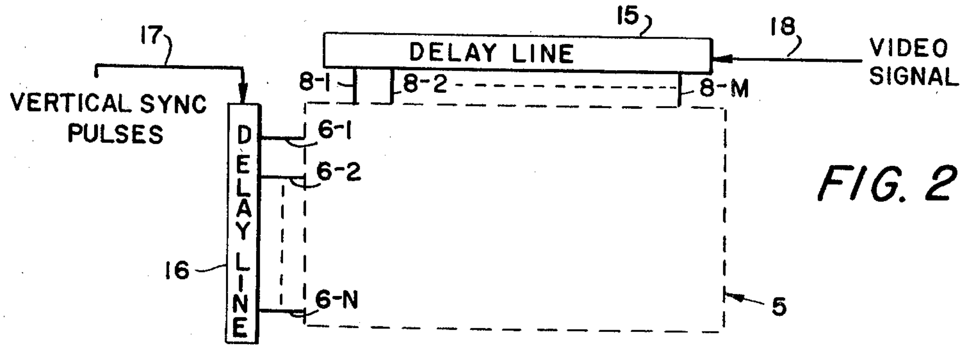
FIG. 2 is a schematic illustration of a first illustrative embodiment of my invention.

Referring to FIG. 2, the electroluminescent panel 5 itself is as described above with reference to FIG. 1. However, horizontal conductors 6–1 through 6–N are coupled to delay line 16 at 63.5 microsecond delay intervals, and conductors 8–1 through 8–M are coupled to delay line 15 at equal spaced intervals. The delay of delay line 15 from the right end to conductor 8–1 corresponds to the time required for one complete line sweep in a conventional television receiver. The delay along the delay line between conductors 8–1 and 8–M is 53.3 microseconds, corresponding to that portion of each cycle during which picture information is produced.

Vertical sync pulses are applied via conductor 17 to the input of delay line 16. A vertical pulse appears at the beginning of each frame (every other field in a conventional system). Each vertical pulse travels down the delay line and energizes each of the horizontal conductors in succession. The pulse energizes conductor 6–1 just at the time when the front end of one line of video information appears in delay line 15 at the point to which conductor 8–1 is connected and the end of the line of video information appears in delay line 15 at the point to which conductor 8–M is connected. At this time, and for only a very brief instant, is conductor 6–1 energized. The vertical sync pulse then continues to travel down delay line 16 to energize conductor 6–2 for a very brief instant at just the time when another line of video information is in delay line 15 between conductors 8–1 and 8–M.

Successive lines of video information are fed sequentially via conductor 18 into the right end of delay line 15. The information travels to the left along delay line 15 and out of the delay line at its left end. As each line of information travels down the delay line it has no effect on the system operation because none of the horizontal conductors is energized. However, just when a complete line of video information appears in the delay line between conductors 8–1 and 8–M, one of the horizontal conductors is energized. The complete line of video information, applied to the vertical conductors, is at this time dumped through the respective line of phosphor film to the energized horizontal conductor. The horizontal conductor is energized for only a brief instant (insufficient to allow blurring of the picture as the video signal continues down the delay line) since it must be recalled that the video information continues to move from right to left in delay line 15. Immediately after the information is dumped, the energized horizontal conductor is de-energized, and during the major portion of the next line cycle none of the horizontal conductors is energized. During the cycle another line of video information travels down the delay line 15 and just when it appears between conductors 8–1 and 8–M the next horizontal conductor is momentarily energized. The next line of video information is thus dumped and another line of the video display appears on the phosphor screen. This process continues until the vertical sync pulse reaches horizontal conductor 6–N at which time the last line of video information in the frame is displayed. Thereafter, the next vertical sync pulse on conductor 17 restarts the process.

Of course, the application of video signals to conductor 18 must be synchronized to the application of vertical sync pulses to conductor 17. However, conventional television circuitry is adequate for this purpose. The delay in delay line 16 between the input and the point to which conductor 6–1 is connected is adjusted such that the vertical sync pulse reaches conductor 6–1 at the same time that the front end of the first line of video information in the frame reaches conductor 8–1 connected to delay line 15. In a conventional television receiver there is a blanking interval between successive horizontal sweeps. This does not affect the operation of the system of FIG. 2 because the blanking portion of each line cycle will be at the rightmost end of the delay line, outside the limits of conductors 8–1 through 8–M, whenever one of the horizontal conductors is energized. This blanking portion is to the left of conductor 8–1 (or out of the delay line if it is cut at conductor 8–1) by the time the next horizontal conductor is energized. The system of FIG. 2, while described in terms of a television receiver, is applicable to many different types of display systems. The "video signal" shown in FIG. 2 would in other cases simply be any type of line signal information.

The system of FIG. 2 has been described with reference to individual vertical conductors. However, my invention also embraces the use of a conducting sheet, where the conducting sheet is of the type having a preferred direction of conductivity. In such a case, in place of individual conductors 8–1 through 8-M, a sheet of conducting material may be connected to delay line 15, with the preferred direction of conductivity being in the vertical direction. In such a case, when one of the horizontal conductors is energized the complete line of video information in delay line 15 will be dumped through the vertical conducting sheet and a line of phosphor material into the energized horizontal conductor. Because the sheet displays a preferred direction of conductivity all of the video information in the delay line travels in a vertical direction such that the vertical signals do not interfere with each other. Accordingly, the term "vertical conductors" is used herein so as to include such conducting sheets which in effect have a very large number of parallel vertical conductors.

It is also possible to design a color television electroluminescent panel along the lines disclosed in FIG. 2. In such a case, instead of a single group of vertical conductors 8–1 through 8–M, three such groups may be provided, each group coupled to a respective one of three delay lines such as delay line 15. The electroluminescent panel may consist of alternating vertical lines of phosphors for producing red, green and blue colors. Each set of three vertical conductors, one in each of the three different delay line groups, overlies the three respective phosphor lines in a respective panel section. The three color video signals are applied to the three respective delay lines. This color electroluminescent panel is in effect three separate panels of the type disclosed in FIG. 2, except that a single set of horizontal conductors may be sufficient for controlling the dumping of three lines of color information in the three delay lines at the same time.

It is also possible to provide a gating mechanism for coupling conductors 8–1 through 8–M to delay line 15. This gating mechanism may be briefly operated only when the signal information in each line cycle is in delay line 15 betwen conductors 8–1 and 8–M. In such a case, one of conductors 6–1 through 6–N may be energized throughout each 63.5 microsecond cycle since the gating mechanism controls the signal dumping through the vertical conductors and the horizontal conductor at the end of each line cycle. Either way, a line of phospor is controlled to luminesce only for an instant at the end of the receipt of each line of video information, when the complete line of information is in delay line 15. The important point to note is that since the signal at each point in delay line 15 constantly changes, a mechanism must be provided to control the coupling of the signal to the phosphor screen, to cause it to luminesce, only momentarily at a time when a complete line of video signal is represented in delay line 15.

Similarly, instead of using a delay line 15 other mechanisms may be provided. The common denominator of all these mechanisms is that a complete line of video signal information is stored during each line cycle. Only after a complete line of information is represented is the line signal effectively coupled to the phosphor to cause it to luminesce.

Figure 3:
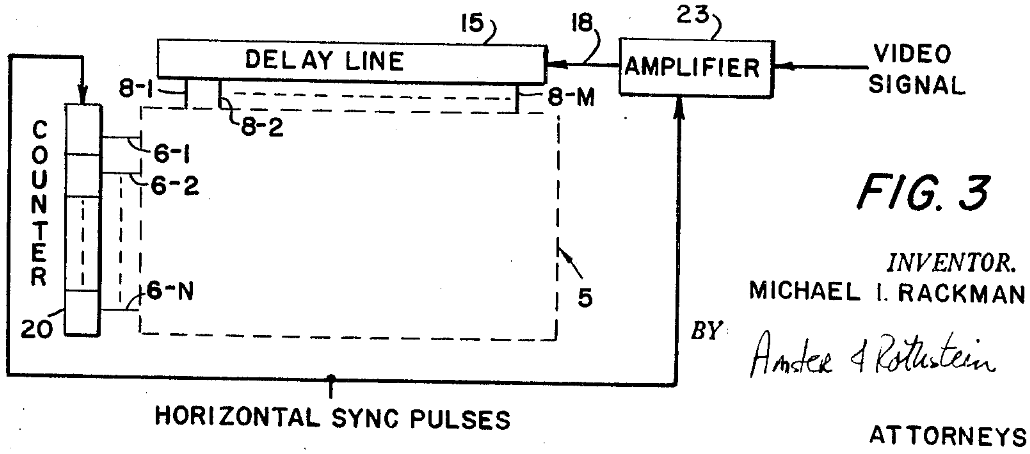
FIG. 3 is a schematic illustration of a second illustrative embodiment of my invention.

The embodiment of FIG. 3 is similar to that of FIG. 2 with two major differences. First, instead of providing a delay line 16 for sequentially energizing the horizontal conductors, a counter 20 is provided for this purpose. Each horizontal sync pulse increments the count of counter 20. (The counter may be reset by vertical sync pulses if desired.) The counter is adjusted such that although each horizontal sync pulse causes the count to be incremented, the count is actually incremented only when a complete line of video information appears in delay line 15 between conductors 8–1 and 8–M. This can be accomplished by providing a suitable delay at the input of counter 20. Each time the counter changes state one of output conductors 6–1 to 6–N is energized. It is energized, however, only for a brief instant when the counter changes state in order that one of the horizontal conductors be energized only for the brief instant when the video information is to be dumped through the system.

In the embodiment of FIG. 3 the video signal is applied through amplifier 23 to delay line 15, rather than directly as in FIG. 2. It is possible that the delay line will attenuate the video signal as it travels from the right end toward the left end. In such a case, the left end of the signal, i.e., the initial portion of each line cycle, will be attenuated to the greatest extent, there being little attenuation for the terminal portion of the signal, since when the video information is dumped through the system the terminal portion is at the right end of the delay line and has not traveled down it. Amplifier 23 is designed to amplify the video signal before it is applied to the delay line in such a way that the amplification factor decreases during each line cycle. The amplifier bias, for example, may be controlled by an R-C charging circuit such that the amplification factor tapers off during each line cycle. Each horizontal sync pulse restarts the R-C charging so that the front portion of each line of video information will be greatly amplified, with the terminal portion of each signal receiving the least amplification. In this way, the visual signal will faithfully reproduce the video signal. Any of many conventional amplifiers may be used for this purpose.

It is recognized that in conventional television systems each frame includes odd and even fields, with the lines of each field being interlaced with the lines of the other. The systems of FIGS. 2 and 3 are suitable for interlaced scanning. For example, referring to FIG. 3, the horizontal conductors corresponding to the odd field may be energized in sequence, followed by the energization of the horizontal conductors corresponding to the even field. Two counters, or even one counter, may be used for this purpose. Similarly, referring to FIG. 2, two delay lines or even one, corresponding to delay line 16 may be used for this purpose. All that is required is that the sequence of horizontal conductor energizations be 6–1, 6–3, 6–5 . . . , 6–2, 6–4, . . . .

Vertical retrace in a typical television receiver starts in the middle of the scanning of the last line in the odd field. In the systems of FIGS. 2 and 3 when vertical retrace starts the video information corresponding to the first half of the last line in the odd field is in the right half of delay line 15. During vertical retrace no video signal is applied to delay line 15. The first half of the last line of video information in the odd field continues to travel down delay line 15 until it is in the left half of the delay line at which time the last horizontal conductor in the odd field is energized to dump this half-line of video information. Thus, a visual signal appears in only the first half of the last line in the display panel. Even field scanning in a conventional receiver starts in the middle of the top line in the even field. To accomplish this in the circuits of FIGS. 2 and 3 it is only necessary that the first horizontal conductor in the even field be energized at a time when the half-line of video information in the first line of the even field is in the right half of delay line 15 (to the left of conductor 8–M). The left half of the delay line will contain no information since no video information is applied to delay line 15 during vertical retrace. Thus, only a half-line of video information is dumped at the beginning of the even field scan in the ordinary manner. Thereafter, this half-line of information continues down the delay line followed by the next complete line of video information.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

I claim:

1. An electroluminescent display system comprising a first array of parallel conductors, a second array of parallel conductors forming a grid with said first array of parallel conductors, an electroluminescent phosphor film interposed between the conductors in said arrays, a delay line, the conductors in said first array being coupled to said delay line at spaced intervals therealong, means for sequentially applying lines of information signals to be displayed to one end of said delay line, and means for sequentially and momentarily energizing the conductors in said second array, said means for sequentially and momentarily energizing the conductors in said second array energizing one of said conductors at a time when a complete line of information signal appears in said delay line between the first and last conductors in said first array coupled therealong, and energizing said one conductor in said second array for only a small fraction of the time required for a signal to travel through said delay line.

2. An electroluminescent display system in accordance with claim 1 wherein said means for sequentially and momentarily energizing the conductors in said second array includes an additional delay line having said conductors in said second array coupled therealong at spaced intervals, and means for applying to one end of said additional delay line an electrical pulse.

3. An electroluminescent display system in accordance with claim 1 wherein said means for sequentially and momentarily energizing the conductors in said second array includes a counter having a plurality of stages each coupled to one of the conductors in said second array for sequentially and momentarily applying pulses thereto.

4. An electroluminescent display system in accordance with claim 1 further including means for amplifying said information signals prior to the application thereof to said delay line, said amplifying means having an amplification characteristic for tapering off the amplification of each line of information signal from the initial portion to the terminal portion thereof.

References Cited

UNITED STATES PATENTS

| | | | |
|---|---|---|---|
| 2,967,265 | 1/1961 | Diemer et al. | 315—169 |
| 3,263,028 | 7/1966 | Shanafelt et al. | |
| 3,293,356 | 12/1966 | Aiken. | |

ROBERT L. GRIFFIN, Primary Examiner

A. H. EDDLEMAN, Assistant Examiner

U.S. Cl. X.R.

315—169